United States Patent Office
2,972,005
Patented Feb. 14, 1961

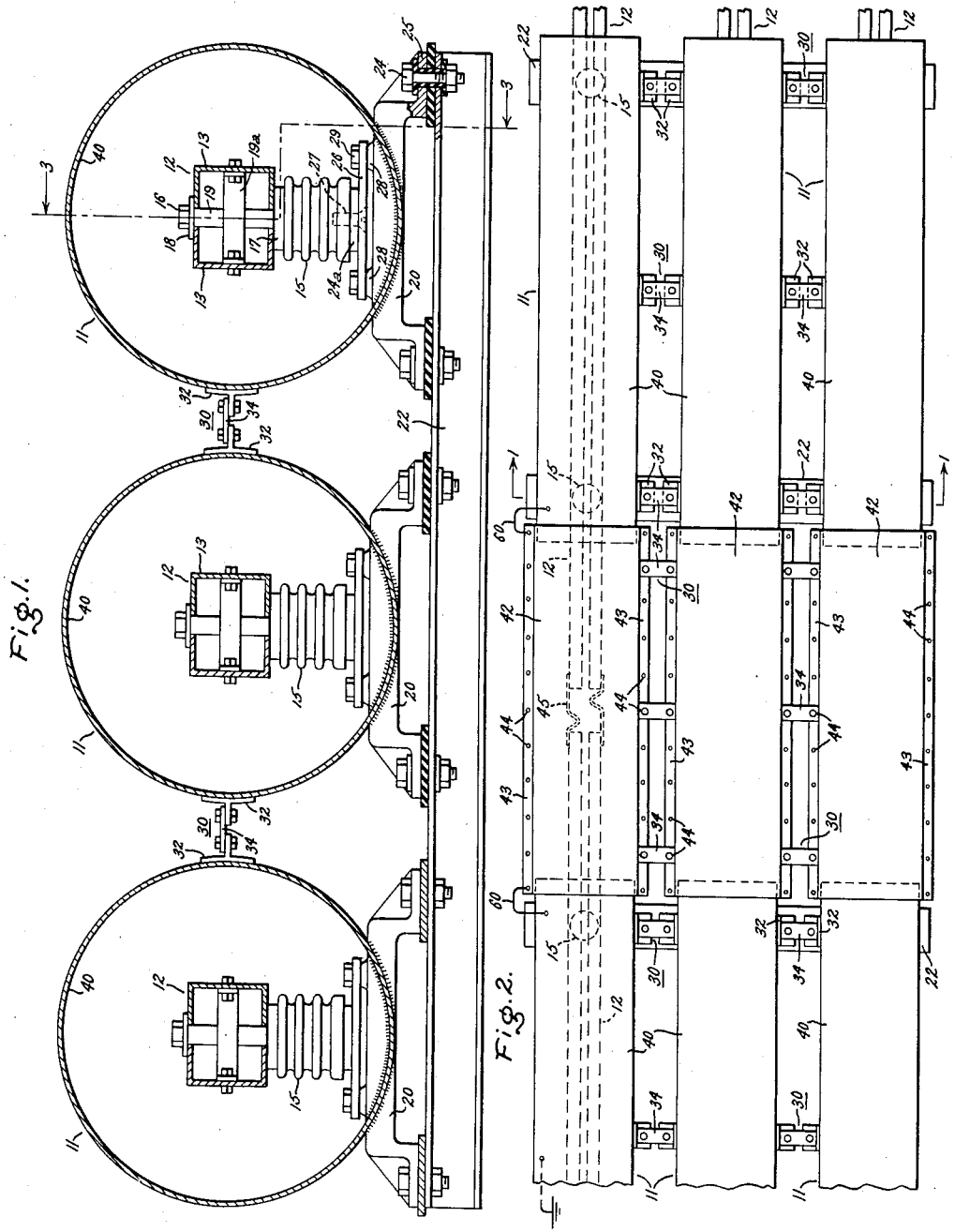

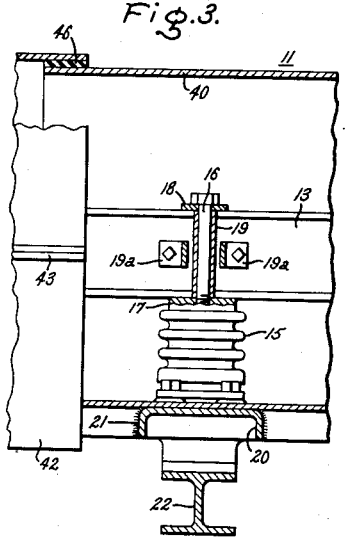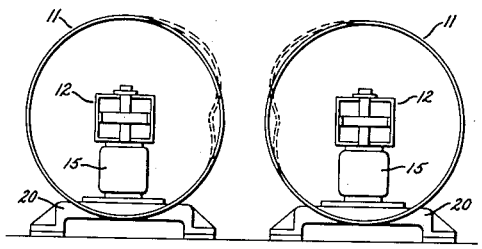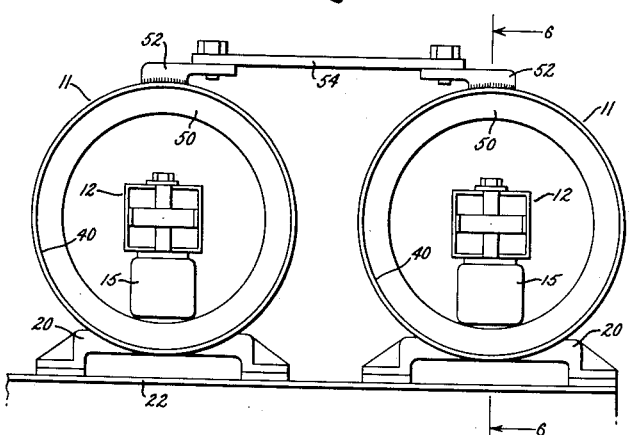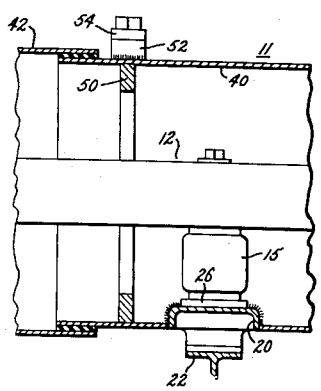
Inventors:
Robert H. Brealey Jr.,
Lawrence L. Mankoff,
by William Freedman
Their Attorney.

2,972,005

ISOLATED PHASE BUS DUCT APPARATUS

Robert H. Brealey, Jr., Broomall, and Lawrence L. Mankoff, Drexel Hill, Pa., assignors to General Electric Company, a New York corporation Filed Oct. 31, 1958, Ser. No. 770,970

7 Claims. (Cl. 174—99)

This invention relates to isolated-phase bus duct apparatus and, more particularly, to improved means for minimizing the mechanical stresses on the bus-conductor-mountings during short circuit conditions.

The usual isolated-phase bus duct apparatus comprises a plurality of adjacent tubular ducts, in each of which is disposed a substantially rigid conductor mounted on insulators. In the past, it has been the general objective of designers of this type of bus-duct apparatus to mount the conductor rigidly and thus prevented from being displaced by the magnetic forces accompanying short circuits. The higher the current for which the bus was designed and, thus, the higher the short circuit current that might be available, the more rigid was made the mounting of the conductor.

A departure from this general approach is disclosed and claimed in application S.N. 458,900—Swerdlow et al. now Patent No. 2,892,012, assigned to the assignee of the present invention. In that application, it is pointed out that there is within a duct of highly conductive material a zero-force line position. A freely suspended conductor will move to this position in response to a short-circuit (say, from the conductor to an adjacent conductor) and will have no further tendency to move even as the short circuit current is increased. At this position, the magnetic restoring force resulting from eddy currents produced in the duct by current flowing through the conductor surrounded by the duct will balance the displacing force resulting from magnetic fields penetrating the duct from nearby conductors. Recognizing that there is such a zero-force line position within a highly-conductive duct, Swerdlow et al. mounted their conductor resiliently and in such a manner that it was capable of moving from its normal position substantially into its zero-force line position. By permitting such movement instead of preventing it, as was the case with the aforementioned rigid mountings, Swerdlow et al. were able to limit the stresses on the mounting insulators to maximum and permissible values.

The physical position of the zero-force line is dependent upon the geometrical shape of the duct. If the duct has relatively thin walls and particularly if it is of a generally circular cross-section, it tends to become distorted during short circuit conditions due to the magnetic interaction between the eddy currents flowing in adjacent ducts. We have found that the distortion which tends to occur is usually of such a character that it tends to shift the zero-force line position further away from the duct centerline than is the case when no distortion occurs. This means that a greater displacement of the conductor from its normal position is necessary in order to allow the conductor to reach the zero-force line position, with the result being that increased loads are imposed upon the insulators. Thus, we have found that duct distortion of the type occurring during short-circuits increases the loads on the insulators and can actually cause an insulator failure if not adequately limited.

Accordingly, an object of our invention is to limit the distortion of a generally circular duct to such an extent that the zero-force line position of the stressed duct is sufficiently close to the normal position of the conductor to preclude the conductor-supporting insulator from being fractured by movement of the conductor into the zero-force line position.

In carrying out our invention in one form, we provide a pair of tubular enclosing ducts of generally circular cross section disposed in substantially parallel laterally spaced apart relationship with the longitudinal axes thereof located in a predetermined plane. Each duct is formed of a low resistance sheet metal having a sufficiently high conductivity to provide appreciable eddy current shielding for the interior portions thereof. Bracing structure is provided between the ducts and is attached to the ducts at longitudinally spaced locations disposed along said predetermined plane. A single substantially rigid phase conductor is mounted within each duct. The resilient mounting means mounts the conductor substantially coaxially with respect to its corresponding duct and comprises a plurality of axially spaced-apart single rigid supporting posts of insulating material. All of said posts in any duct lie in a common plane perpendicular to the plane including the axes of said ducts. The resilient mounting means allows the conductor under short circuit conditions to move from its coaxial position transversely to said common plane and is so constructed that a predetermined amount of said transverse movement is required in order to fracture an insulator. The bracing structure is constructed to limit distortion of each of said ducts under phase-to-phase short circuit conditions to an extent which causes the zero-force line position of the stressed sheath to be located within the range of said predetermined movement.

For a better understanding of our invention reference may be had to the following description taken in conjunction with the accompanying drawing wherein:

Fig. 1 is a cross sectional view taken along the line 1—1 of Fig. 2 and showing enclosed bus duct apparatus embodying our invention.

Fig. 2 is a plan view of the bus duct apparatus depicted in Fig. 1.

Fig. 3 is a side elevational view partially in section taken along the line 3—3 of Fig. 1.

Fig. 4 is a diagrammatic view illustrating the type of duct distortion which tends to occur during short circuit conditions.

Fig. 5 is cross-sectional view similar to that of Fig. 1 illustrating a modified form of our invention.

Fig. 6 is cross-sectional view taken along the line 6—6 of Fig. 5.

Referring now to Fig. 1, there is shown a three-phase bus run of the isolated-phase type. Each phase of the bus run comprises a sheath, or duct, 11 of generally circular cross-section. These ducts are of a relatively thin-walled construction and are formed from sheets of a highly conductive metal, such as aluminum. Supported within each duct is a rigid conductor 12 shown formed of a pair of channels 13 secured together in face-to-face relationship so as to provide a rectangular cross-sectional configuration for the conductor.

Each of the conductors 12 is supported within its corresponding sheath 11 by means of insulators 15 mounted at longitudinally-spaced stations along the length of the conductor. At each station, there is only a single insulator, and this single insulator is disposed in a plane generally perpendicular to a plane which includes the central axes of the ducts.

For securing the conductors 12 to each of their insulators 15, any suitable joints may be provided. We prefer, however, to rely upon joints which each comprise a bolt 16 aligned with an insulator 15 at each insulator station. Each of these bolts 16 is located between the two channel sections 13 of the conductor 12 and is threaded into an end fixture 17 that is integrally united with the upper end of the insulator 15. When the bolt 16 is tightened, it acts through a suitable washer 18 to clamp the conductor 12 to the end fixture 17. A tubular spacer 19 surrounding the shank of the bolt 16 limits the clamping pressure to a desired value. If the joint is to be a slip joint that is intended to allow for lengthwise expansion and contraction of the conductor 12, then the channels 13 are secured together by straps 19a longitudinally spaced from the spacer 19, as is shown, for example, in Fig. 3. The spacing between the straps 19a and the spacer 19 allows the conductor 12 to move in a lengthwise direction without interference between the straps 19a and the spacer 19. For those joints where no longitudinal movement of the conductor 12 relative to its insulator 14 is contemplated the straps 19a are located close enough together to remain in engagement with the spacer 19.

For supporting both the insulators 15 and the ducts 11, a support 20 is provided at each insulator station. Each of these supports 20 is preferably an aluminum casting of U-shaped cross-section extending in a chordal direction across the lower portion of the sheath 11 and fitted into a slot 21 provided in the sheath. The sheath is attached to the support 20 by suitable means, such as a welded joint provided around the perimeter of the slot 21. The supports 20 for the three sheaths 11 are preferably disposed in aligned positions along the length of the sheaths so that a single transverse beam 22 provided at each insulator station can be utilized as a common support for the three enclosures. The three aligned supports 20 are shown in Fig. 1 bolted to such a transverse beam 22 by means of bolts 24 extending through lugs 25 provided at opposite ends of each support 20.

For mounting the insulators 15 on their respective supports 20, a resilient base plate 26 is provided between each insulator 15 and each support 20. Each of these resilient base plates 26 is secured to its insulator 15 by means of suitable screws such as shown at 27 clamping the base plate to an end fixture 24a that, in turn, is suitably united to the lower end of the insulator 15. At opposite ends of the baseplate 26, bosses 28 are provided in the support 20 so as to space the resilient base plate 26 from the support in the region between the bosses. This spacing helps to impart the required yieldability to the base plate 26. Suitable bolts 29 extending through the base plate 26 in alignment with the bosses 28 clamp the base plate 26 to the support 20.

The normal position of each of the conductors 12 within its duct 11 is with its longitudinal axis coinciding with the central longitudinal axis of the duct 11, i.e., coaxially with respect to the duct. Under short-circuit conditions, however, the conductor 12 tends to move from its normal position to the "zero-force line" position described hereinabove. When a conductor reaches this zero-force line position, it will have no further tendency to move even as the short-circuit current is increased. To explain this more fully, it will be assumed that a short circuit has developed between two adjacent phase conductors enclosed by ducts of highly conductive material. The highly conductive ducts will act to shield each of the two conductors from the magnetic field of the other conductor, but a certain amount of flux from this other conductor will nevertheless penetrate the duct of the one conductor and react with the flux surrounding the one conductor to displace it from its normal position at the center of the duct. The force resulting from this penetrating field can be termed the displacing force. This displacing force is opposed by a restoring force which acts in a direction to return the conductor to the center of the duct. This restoring force results from eddy currents produced in the duct surrounding the one conductor by short-circuit current flowing through the one conductor when it is displaced from the duct center. This restoring force increases as a direct function of the distance of the conductor from the duct center. At some particular distance from the duct center, this restoring force will equal the displacing force, and this position is termed the zero-force line position. When a conductor reaches this position, further increases in short circuit current will increase both the restoring force and the displacing force by equal amounts, and there will, therefore, be no further tendency for the conductor to move in response to such increased currents.

The purpose of the resilient base plates 26 is to allow the rigid conductors 12 under short-circuit conditions (including short circuits between adjacent phases) to move substantially into the above-described zero-force line position. To this end, the plates 26 have sufficient yieldability to enable the conductor to be moved into such zero-force line position without fracturing the rigid insulators 15.

We have recognized that the ability of the resilient base plates 26 to function in their intended manner (described hereinabove) depends to a critical extent upon preventing substantial distortion of the thin-walled ducts 11 during short-circuit conditions. This can be explained by considering first that the physical position of the zero-force line is dependent upon the geometric shape of the duct. In this regard, the above-described restoring force is dependent upon the distance of the conductor from the geometric center of the sheath. If the shape of the duct changes in a non-symmetrical manner, due, for example, to magnetically-produced distortion, the position of the geometric center also changes, and this results in a change in the restoring force (assuming no change in the conductor position during duct-distortion). In order to maintain a balance between restoring force and the relatively-constant displacing force, it is necessary that the conductor move into some new position relative to the original geometric center of the duct. The new position at which this balance is achieved is the zero-force line position of the stressed or distorted duct.

To illustrate more particularly the manner in which duct-distortion can cause a change in the position of the zero-force line, reference will be had to Fig. 4, which shows schematically a pair of enclosed buses similar to those of Figs. 1–3 during the existence of a short circuit between the phase conductors. Normally the ducts occupy the position shown in solid lines but under short circuit conditions they tend to become egg-shaped as illustrated by the dotted lines. The reason for this distortion into an egg-shape is that the eddy-currents in the two ducts tend to concentrate in the regions which are closest togeher, and when these eddy currents abruptly increase due to short circuit current flowing through the two conductors, the magnetic interaction of the eddy-currents forces the adjacent walls of the duct to move away from each other into approximately the dotted line positions shown. Considering for the moment only the right hand duct 11, the distortion which occurs causes the centerline of the duct to move to the right. The zero-force line position before distortion was to the right of the original duct centerline, and movement of the centerline toward the original zero-force line reduces the magnitude of the restoring force. An increase in restoring force is necessary to restore a balance between the restoring force and the displacing force, and this increase in restoring force can be effected only by movement of the conductor further to the right. At a position further to right where this balance is achieved, a new zero-force line position is present.

Since this new zero-force line position is more remote from the original position of the conductor than the original zero-force line position was, it will be apparent that movement of the conductor into the new zero-force line position will load the mounting insulator to a much greater extent than did movement into the original zero-force line position. Thus, it will be apparent that distortion of the duct in the manner illustrated in Fig. 4 will result in much greater loads being applied to the conductor-mounting insulators.

Recognizing that the type of duct distortion which does occur during short-circuits tends to unduly load the insulators, we have overcome this difficulty by bracing the ducts in such a manner that duct-distortion is held within acceptable limits from an insulator-loading viewpoint. To this end, we have provided between adjacent ducts 11 a plurality of braces 30 which are attached to the ducts at locations disposed in the reference plane which includes the central axes of the ducts. It is in this region that the duct eddy-currents are concentrated to the greatest extent, and it is, therefore, in this region that the magnetic forces tending to distort the ducts are the greatest. By locating the braces where the forces are the greatest, it becomes unnecessary to brace the ducts over extended portions of their periphery in order to hold duct-distortion within acceptable limits.

One of the braces 30 is shown in Fig. 1 as comprising a pair of aligned T-shaped fixtures 32, each of which is welded to the periphery of a duct, and a rigid bar 34 bolted at its opposite ends to the projecting legs of the T-shaped fixtures 32. As will be evident from Fig. 2, other braces 30 generally corresponding to this brace 30 of Fig. 1 are located at points spaced along the length of the entire bus run. The longitudinal spacing between adjacent braces is sufficiently small to limit duct distortion, even under the most severe short circuit conditions, to an extent which precludes overloading of the bus-mounting insulators 15. More specifically, the resilient plates 26 will enable each of the rigid conductors to be moved a predetermined distance from its normal position before fracture of the insulators 15 will occur. The braces are designed to limit duct-distortion to such an extent that the zero-force line position of the conductor during the most severe short circuit conditions is located within this predetermined range of movement. Thus, the conductor can move into such zero-force line position without fracturing the insulators even when its duct is subjected to the maximum available forces tending to distort it.

To more fully describe the construction of the ducts 11, it will be apparent from Figs. 2 and 3 that each of the ducts 11 is formed from a plurality of main duct section 40 interconnected by split covers 42. Each of the split-covers comprises a pair of semi-cylindrical halves having radially-outwardly projecting flanges 43 extending along the length of the half, and adapted to be bolted to the corresponding flanges of a mating half. Suitable gaskets (not shown) are interposed between mating flanges, and these gaskets are compressed by the bolts which clamp the flanges together, thereby providing an effective seal between the flanges. The bolts for clamping the flanges together are designated 44 in Fig. 2. In each sheath, the main duct sections 40 are disposed in collinear, longitudinally spaced-apart relationship, and the halves of the split covers 42 are clamped about the adjacent ends of the main duct sections. Suitable gaskets, such as shown at 46 in Fig. 3, extending about the periphery of each main duct section 40 are furnished to provide an effective seal between the main duct sections 40 and the split covers 42.

The insulator-mounting members 20 are located at opposite ends of each of the main duct sections 40, and these members 20 provide the sole supporting structure for both the main duct sections 40 and the split-covers 42. The conductor 12 of each duct is divided into axially-spaced sections which are electrically interconnected by suitable flexible jumpers 45. Each section of conductor 12 extends continuously through its main duct section and has its opposite ends disposed within the split covers 42, thereby locating the flexible joints between the sections of the conductor 12 within the split covers 42.

It will be noted from Fig. 3 that the braces 30 are provided both between adjacent main duct sections 40 and adjacent split covers 42. Those braces 30 between the split covers 42 do not include the T-shaped fixtures 32 shown in Fig. 1 and simply comprise rigid bars 34 bolted directly to the flanges of the split covers 42 by means of bolts 44. Preferably, each set of braces between adjacent main duct sections 40 includes at least two braces which are located at opposite ends of the adjacent main duct sections 40 as close as possible to the ends of the split covers 42. Because of their longitudinally-extending flanges, the split covers 42 are somewhat more resistant to distortion than the main duct section 40 and tend to transmit their loads to the ends of the main duct sections. Those braces 30 which are located immediately adjacent the ends of main duct section are ideally located to effectively limit distortion as a result of such transmitted loads.

In selecting locations for the braces 30, it should be borne in mind that it is generally not enough that the braces act merely to preclude the ducts from becoming permanently set or otherwise overstressed by duct-distortion. The braces must not only limit duct-distortion to such extent (i.e., to an extent which precludes damage to the ducts) but must limit duct-distortion even further, and, specifically, to an extent which precludes the zero-force line of the distorted duct from shifting beyond the range of movement that the resilient base plates 26 will allow the conductor 12 before any of the insulators 15 are fractured. The braces 30 must be capable of limiting duct-distortion to this latter extent under the most severe short circuit conditions, such as those short circuits between adjacent phases which, without the braces 30, would produce sufficient duct-distortion to cause the zero-force line position to be located beyond the range of conductor-movement that would result in insulator failure.

To provide an example of the type of short circuit currents that can produce the aforementioned excessive duct distortion if proper bracing is not provided, reference will be had to some tests conducted with a bus duct apparatus constructed as shown in the drawings but with the bracing bars positioned about 6 inches above the line connecting the duct centerlines. In this apparatus, the circular ducts were formed of aluminum having an outside diameter of about 27 inches and a wall thickness of about 3/16 inches with the walls of adjacent ducts spaced apart about 5 inches at their closest point. A short circuit current of about 230,000 amperes during a phase-to-phase short circuit produced sufficient duct distortion to result in insulator failure, but when the braces were replaced by braces located on the line connecting the centerlines of the ducts, insulator loadings were held well within acceptable limits under equally severe and even more severe short circuit conditions. For this particular bus apparatus, the braces should preclude excessive duct distortion, even for phase-to-phase short circuit currents well in excess of 300,000 amperes.

Although we prefer to use the type of bracing shown in Figs. 1-3, it is to be understood that other forms of bracing could alternatively be used in order to limit duct-distortion to the required extent. For example, the bracing structure in the main duct sections may be constructed as shown in Fig. 5. This bracing structure of Fig. 5 comprises a pair of heavy metallic reinforcing rings 50, each of which is welded to the internal wall of its surrounding duct section 40, fixtures 52 welded to the two ducts near the top thereof, and a bracing bar 54 bolted at its opposite ends to the fixture 52. In this modified arrangement, two bracing structures of the type shown in Fig. 5 are located preferably at opposite ends of each main duct section 40. The location of one of these bracing structures is illustrated in Fig. 6. For relatively low phase-to-phase short circuit currents, the rings 50 are alone sufficient to limit duct-distortion to the required extent. But for extreme high short circuit currents, the bracing bar 54 is needed to impart additional rigidity to the ducts so as to limit duct-distortion to the required extent. It is to be noted that although the bracing bar 54 of Fig. 5 is not located immediately adjacent the plane which includes the duct centerlines, it nevertheless helps to prevent duct-distortion in this critical region inasmuch as the reinforcing rings 50 are present in this critical region to transmit forces from this region to the bracing bar 54. Whatever the specific form of the bracing that is utilized, it should be so constructed that it limits distortion of the ducts in the region where they are the closest together to such an extent that the zero-force line is precluded from shifting beyond the range of movement that the resilient base plates 26 will allow the conductor 12 before any of the insulators 15 is fractured.

It is to be understood that the ducts 11 shown in Figs. 1–3 are normally at ground potential and are preferably connected to ground in such a manner that eddy currents induced in the ducts are prevented from circulating between laterally-adjacent ducts and are also prevented from circulating through paths which include the beams 22. A suitable grounding scheme capable of acting in this manner is shown and claimed in the aforementioned Swerdlow et al. Patent No. 2,892,012, and such grounding scheme may be used in the bus duct apparatus of the present invention.

Another grounding scheme usable with the bus duct apparatus of the present invention is the grounding scheme disclosed and claimed in application S.N. 771,131 Swerdlow et al., filed October 31, 1958, assigned to the assignee of the present invention. In this latter grounding scheme, one of the ducts has all of its sections electrically connected together in series and connected to ground at the source end of the apparatus so that it serves as a ground return bus for the apparatus. Such duct is shown at the top of Fig. 2, where its juxtaposed sections are shown electrically connected together in series by the conductive jumpers diagrammatically illustrated at 60. This latter duct is shown at the left hand side of Fig. 1 in electrical contact with the grounded beam 22. The paths to ground through this and the other beams 22 are of a relatively high resistance and reactance in comparison to that through the duct and, thus, very little fault current will flow to ground through the beams. The other two ducts are insulated from all of the beams 22 by insulation disposed between the supports 20 and the beams 22. In each of these latter two ducts, each of the split covers 42 is insulated from that duct section 40 at one of its ends and is electrically connected to that duct section 40 at its opposite end (by means not shown). Only a single one of the braces 30 between each pair of laterally adjacent main duct sections 40 is metallic, whereas the other braces are at least partially of insulating material. The metallic braces 30 are utilized to connect the latter two ducts to the duct that serves as the ground return bus. The other braces, being of insulating material, prevent eddy currents from circulating between laterally-adjacent ducts. For a more detailed description of this grounding scheme, reference may be had to the aforesaid application S.N. 771,131.

While we have shown and described particular embodiments of our invention, it will be obvious to those skilled in the art that various changes and modifications may be made without departing from our invention in its broader aspects and we, therefore, intend in the appended claims to cover all such changes and modifications as fall within the true sprit and scope of our invention.

What we claim as new and desire to secure by Letters Patent of the United States is:

1. Isolated-phase bus duct apparatus for an electric circuit comprising at least two tubular enclosing ducts of generally circular cross-section disposed in substantially parallel, laterally spaced-apart relationship with the longitudinal axes thereof located in a predetermined plane; said ducts each being formed of low resistance sheet metal having a sufficiently high conductivity to provide appreciable eddy current shielding for the interior portions thereof; bracing structure provided between said ducts and attached to said ducts at longitudinally-spaced locations disposed along said predetermined plane; a single substantially rigid phase conductor within each duct; resilient means mounting said conductor substantially coaxially with respect to its corresponding duct; said resilient mounting means comprising at locations longitudinally spaced-apart along said conductor single rigid supporting posts of insulating material mounted within each duct adjacent the wall thereof; all said posts in any said duct lying in a common plane perpendicular to the plane including the axes of said ducts; said resilient means allowing said conductor under short circuit conditions to move from its coaxial position transversely to said common plane and being so constructed that transverse movement of the conductor through a predetermined range is required in order to fracture an insulating supporting post; said bracing structure being constructed to limit distortion of each of said ducts under phase-to-phase short circuit conditions to an extent which causes the zero-force line position of the stressed duct to be located within said predetermined range of movement; the wall thickness of each of said ducts being of such value that, in the absence of said bracing structure, said phase-to-phase short circuit conditions would produce sufficient duct-distortion to cause the zero-force line position of the distorted duct to be located beyond said predetermined range of movement.

2. Isolated phase bus duct apparatus for an electric circuit comprising at least two tubular enclosing ducts of generally circular cross-section disposed in substantially parallel laterally spaced-apart relationship with the longitudinal axes thereof located in a predetermined plane, said ducts each being formed of low resistance sheet metal having a sufficiently high conductivity to provide appreciable eddy current shielding for the interior portions thereof, bracing structure provided between said ducts and attached to said ducts at longitudinally spaced locations disposed along said predetermined plane, a single substantially rigid phase conductor within each duct, resilient means mounting said conductor substantially coaxially with respect to its corresponding duct, said resilient mounting means comprising at locations longitudinally spaced-apart along said conductor single rigid supporting posts of insulating material mounted within each duct adjacent the wall thereof, all said posts in any said duct lying in a common plane perpendicular to the plane including the axes of said ducts, said resilient means allowing said conductor under short circuit conditions to move from its coaxial position transversely to said common plane and being so constructed that transverse movement of said conductor through a predetermined range is required in order to fracture an insulating supporting post, said bracing structure being constructed to limit distortion of each of said ducts under phase-to-phase short circuit conditions to an extent which causes the zero force line position of the stressed sheath to be located within said predetermined range of movement even for phase-to-phase short circuit currents substantially in excess of 250,000 amperes, the wall thickness of said ducts being of such value that, in the absence of bracing structure adjacent said predetermined plane, phase-to-phase short circuit currents of 250,000 amperes would produce sufficient duct-distortion to cause the zero-force line position of the distorted duct to be located beyond said predetermined range of movement.

3. Isolated-phase bus duct apparatus for an electric circuit comprising at least one pair of tubular enclosing ducts of generally circular cross-section disposed in substantially parallel, laterally spaced-apart relationship with the longitudinal axes thereof located in a predetermined plane; said ducts each being formed of low resistance sheet metal having a sufficiently high conductivity to provide appreciable eddy current shielding for the interior portions therof; bracing structure located at points spaced along the length of each of said ducts and imparting rigidity to said ducts in the region of said predetermined plane, a single substantially rigid phase conductor within each duct; resilient means mounting said conductor substantially coaxially with respect to its corresponding duct; said resilient mounting means comprising at locations longitudinally spaced-apart along said conductor single rigid supporting posts of insulating material mounted within each duct adjacent the wall thereof; all said posts in any said duct lying in a common plane perpendicular to the plane including the axes of said ducts; said resilient means allowing said conductor under short circuit conditions to move from its coaxial position transversely to said common plane and being so constructed that transverse movement of said conductor through a predetermined range is required in order to fracture an insulating supporting post; said bracing structure being constructed to limit distortion of each of said ducts under phase-to-phase short circuit conditions to an extent which causes the zero-force line position of the stressed duct to be located within said predetermined range of movement; the wall thickness of each of said ducts being of such value that, in the absence of said bracing structure, said phase-to-phase short circuit conditions would produce sufficient duct-distortion to cause the zero-force line position of the distorted duct to be located beyond said predetermined range of movement.

4. The apparatus of claim 3 in which said bracing structure is constructed to limit duct distortion to an extent which causes the zero-force line position of the stressed duct to be located within said predetermined range of movement even for phase-to-phase short circuit currents substantially in excess of 250,000 amperes, the wall thickness of said ducts being of such value that, in the absence of bracing structure adjacent said predetermined plane, phase-to-phase short circuit currents of 250,000 amperes produce sufficient duct distortion to cause the zero-force line position of the distorted duct to be located beyond said predetermined range.

5. The apparatus of claim 3 in which said bracing structure engages each of said ducts at locations disposed substantially in said predetermined plane.

6. The apparatus of claim 3 in which at least one of said ducts comprises a main duct section in which two of said insulating supporting posts are mounted, said one duct further comprising auxiliary duct sections devoid of said insulating supporting posts and removably secured to the ends of said main duct section in substantially co-linear relationship therewith, said bracing structure engaging said main duct section at the ends of said main duct section immediately adjacent the ends of said auxiliary duct sections.

7. The apparatus of claim 6 in which said bracing structure further comprises braces secured between said auxiliary duct sections and the laterally-adjacent duct.

References Cited in the file of this patent

UNITED STATES PATENTS

| | | |
|---|---|---|
| 2,293,310 | Rudd | Aug. 18, 1942 |
| 2,297,279 | Attwood | Sept. 29, 1942 |
| 2,531,017 | West et al. | Nov. 21, 1950 |
| 2,706,744 | Rudd | Apr. 19, 1955 |
| 2,892,012 | Swerdlow et al. | June 23, 1959 |

OTHER REFERENCES

Ashdown et al.: "Cantilever Loaded Insulators For Isolated Phase Bus," AIEE Technical Paper 54-141, December 1953, all pages.